Aug. 15, 1967  H. KURKJIAN  3,335,979
AIRCRAFT
Filed Oct. 22, 1965  4 Sheets-Sheet 1

INVENTOR.
HAIG KURKJIAN
BY McClurg + Weisy
ATTORNEYS.

Aug. 15, 1967  H. KURKJIAN  3,335,979
AIRCRAFT
Filed Oct. 22, 1965  4 Sheets-Sheet 2

INVENTOR.
HAIG KURKJIAN
BY McClure + Weiser
ATTORNEYS.

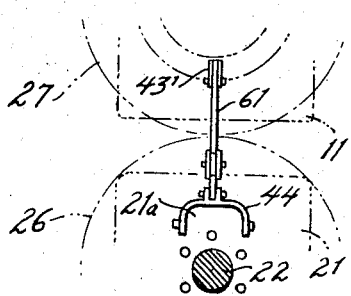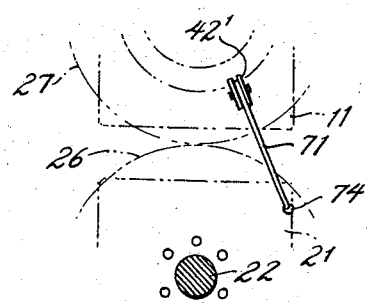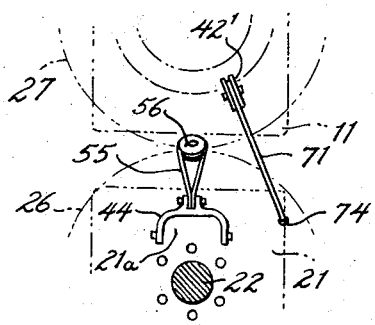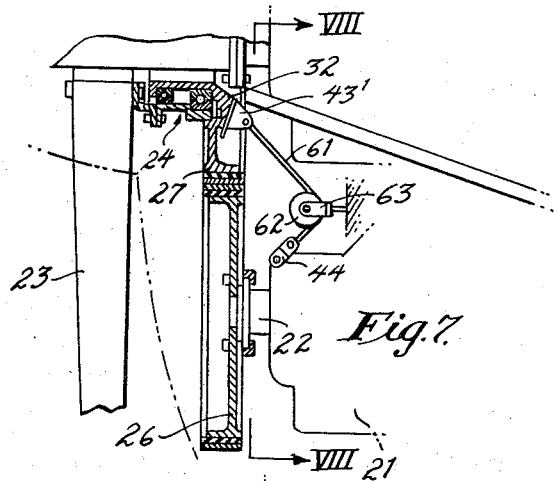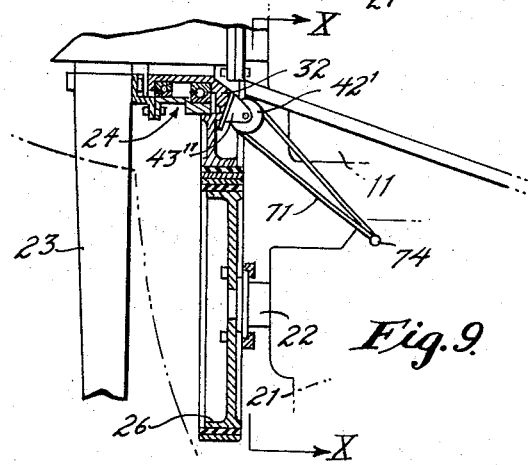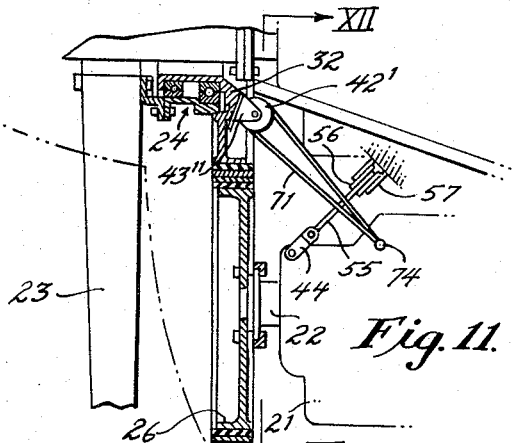

Aug. 15, 1967 H. KURKJIAN 3,335,979
AIRCRAFT
Filed Oct. 22, 1965 4 Sheets-Sheet 4

INVENTOR.
HAIG KURKJIAN
BY McClurg & Weiser
ATTORNEYS.

United States Patent Office 3,335,979
Patented Aug. 15, 1967

3,335,979
AIRCRAFT
Haig Kurkjian, Malvern, Pa., assignor to B. E. Wallace Developments, Inc., Malvern, Pa., a corporation of Pennsylvania, and Haig-K Aircraft Corporation, Malvern, Pa., a corporation of Pennsylvania, jointly
Filed Oct. 22, 1965, Ser. No. 500,718
16 Claims. (Cl. 244—60)

This invention relates to propeller aircraft, concerning especially multi-engined aircraft having coaxial propeller drive shafts.

Whereas a simple propeller is customarily driven on an engine drive shaft, if it is desired to mount another propeller for rotation about the same axis by a separate engine the resulting off-axis, as compared with in-line, drive presents difficulties.

A primary object of the present invention is provision of an improved separate-engine drive system for a plurality of propellers mounted for rotation about a common axis.

Another object is counteraction of undesired displacement resulting from propeller thrust in an off-axis drive system.

A further object is counteraction of undesired displacement resulting from engine torque in an off-axis drive system.

Other objects of this invention, together with means and methods for attaining the various objects, will be apparent from the following description and the accompanying diagrams.

FIG. 7 is a fragmentary side elevation, partly in section and partly diagrammatic, of yet another embodiment of the present invention;

FIG. 8 is a fragmentary front elevation of components shown in FIG. 7, taken at VIII—VIII thereon;

FIG. 9 is a side elevation similar to FIG. 7 but showing a further embodiment of this invention;

FIG. 10 is a fragmentary front elevation taken at X—X on FIG. 9;

FIG. 11 is a side elevation similar to FIG. 9 but with an added component to constitute a still further embodiment of the invention; and FIG. 12 is a front elevation taken at XII—XII on FIG. 11;

Figure 1:
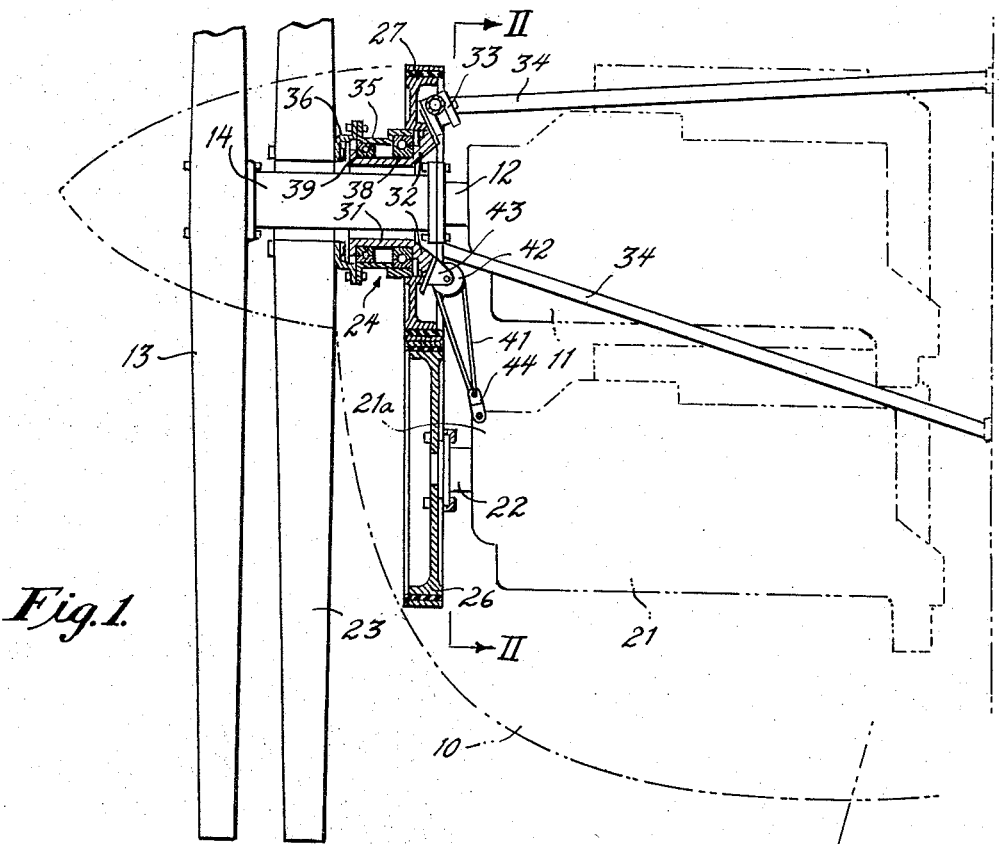
FIG. 1 is a side elevation, partly in section and partly diagrammatic, of an aircraft embodiment of coaxial propeller drive system according to the present invention.

In general, the objects of this invention are accomplished in coaxial drive means for a plurality of propellers in aircraft or the like driven by a corresponding plurality of engines, at least one of which is an off-axis engine, by means of an interconnecting drive sleeve and one or more stabilizing stays interconnecting the engine or the sleeve to the frame or to one another or both to the frame and to one another. Representative embodiments thereof are illustrated, as indicated above, with identical parts in the various views being identified by unchanged reference numerals, and with redundant or superfluous parts being omitted from most views in the interest of simplicity.

FIG. 1 shows from the side, in a partially sectional and partially diagrammatic view, a first embodiment of the present invention in aircraft 10 outlined (in part) by broken lines, having a first engine 11 (similarly indicated in outline only) and drive shaft 12 thereof with extension 14 affixed thereto carrying a first propeller 13 affixed to the forward end thereof, and having a second engine 21 (similarly indicated) located parallel to the first and with drive shaft 22. Second propeller 23 is carried on sleeve assembly 24 spaced coaxially about first drive shaft 12 and is interconnected to second engine 21 by driving wheel 26 carried on drive shaft 22 and driven wheel 27 carried on the sleeve assembly.

As shown in cross section in FIG. 1, sleeve assembly 24 comprises fixed supporting sleeve 31, which is flanged outwardly at its forward end. At its other end the supporting sleeve has flange 32 projecting rearwardly therefrom, to which are affixed, through shock-absorbing mounts 33, struts 34 supported by connection to the rear wall of the engine compartment. Stepped rotary sleeve 35 surrounds supporting sleeve 31 and carries driven wheel 26 secured onto its larger end (internal diameter) while the smaller end of the rotating sleeve is flanged and is secured to propeller 23 by drive flange 36 bolted thereto. Large and small bearing assemblies 38 and 39 space rotating sleeve 35 from fixed supporting sleeve 32 at the rear and front ends, respectively. The forward edge of the outer race of the larger rear bearing rests against the offset of the rotating sleeve, while the rearward edge rests against the rear flange of the supporting sleeve. The forward edge of the race of the smaller front bearing rests against the flange of the supporting sleeve, while the outer race rests against the smaller diametered front end of the rotating sleeve.

Figure 2:
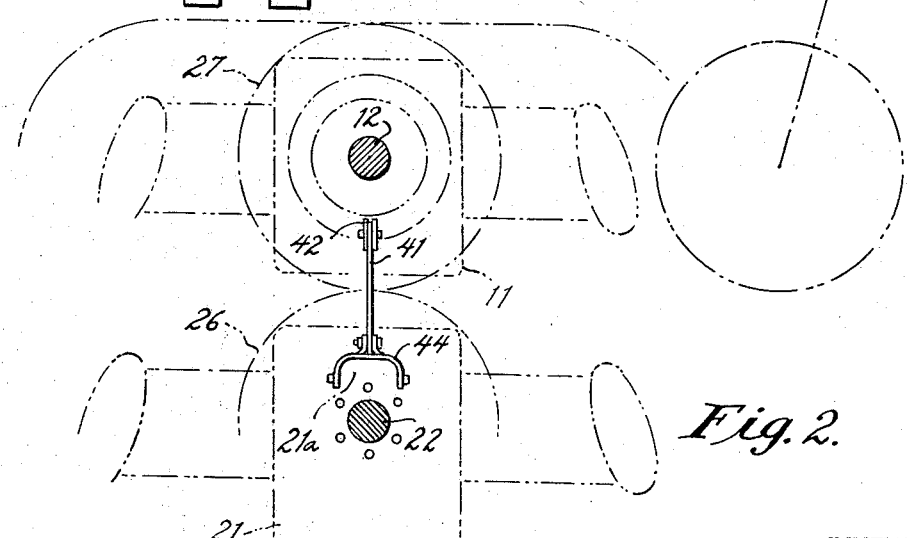
FIG. 2 is a diagrammatic front elevation of components of the embodiment shown in FIG. 1, taken at II—II thereon.

Also visible in FIG. 1 and in the corresponding front elevation, FIG. 2, is stay 41 in loop form about pulley 42 carried by bracket 43 on angled flange 32 on the rear end of fixed supporting sleeve 31. The ends of the stay loop are retained in clip 44, which is U-shaped (v. the front view in FIG. 2) and is fastened to the upper front portion 21a of engine 21 at a location substantially directly below the pulley. The stay is preferably assembled under tension, and it functions to retain driving and driven wheels 26 and 27 in substantial frictional contact with one another. It also will be apparent that forward thrust of propeller 23 tends to displace fixed supporting sleeve forward, and this tends to tighten stay 41; the tension increase in the stay may be resolved into components respectively parallel and perpendicular to the axes of wheels 26 and 27, whereupon the perpendicular component acts to press the peripheral surfaces of the wheels more tightly together. In addition, the reaction of engine 21 to its torque tends to rotate its housing in the opposite direction to its rotating shaft 22, which carries drive wheel 26. This also tightens the stay, and the increased tension in it may be resolved into respective radial and tangential components, as through the point of attachment to the engine, whereupon the radial component also acts to press the peripheral surfaces of wheels 26 and 27 more tightly together. In the absence of the stay, the torque reaction of engine 21 (and, to a lesser extent, the forward thrust of propeller 23 driven thereby) would tend to reduce the frictional contact of the peripheral surfaces of drive wheel 26 and driven wheel 27, thereby diminishing the power transmitted from the engine to the propeller.

Figure 4:
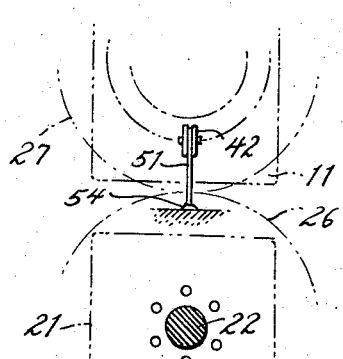
FIG. 4 is a fragmentary front elevation taken at IV—IV on FIG. 3.
Figure 3:
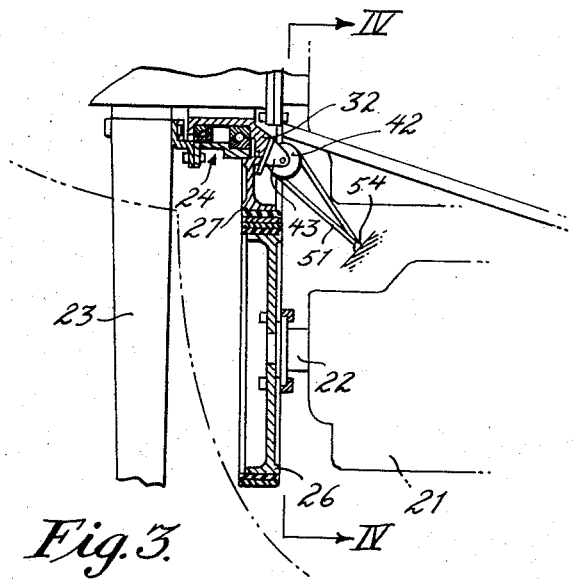
FIG. 3 is a fragmentary side elevation corresponding generally to the more complete view of FIG. 1 but showing another embodiment of this invention.

FIGS. 3 and 4 show from the side and front, respectively, a modification of the invention, in which the only change is that the previously illustrated stay is replaced by stay 51 looped as before about pulley 42 carried by fixed supporting flange 32 of sleeve assembly 24. Unlike the previous stay, stay 51 is attached to a fixed frame component (indicated schematically) as by a bolt at point 54 located considerably rearward, as well as downward, from the pulley, the rearward inclination increasing the component of force tending to press wheels 26 and 27 more tightly together in response to forward thrust of propeller 23. The torque reaction of engine 21 makes no contribution in this modfiication but does in the further modification shown in the next pair of views.

Figure 6:
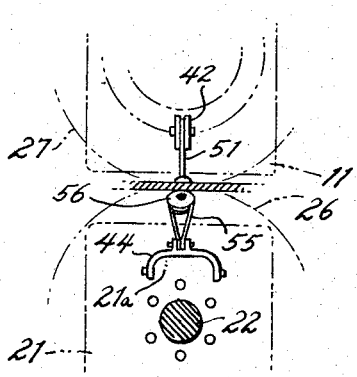
FIG. 6 is a front elevation taken at VI—VI on FIG. 5.
Figure 5:
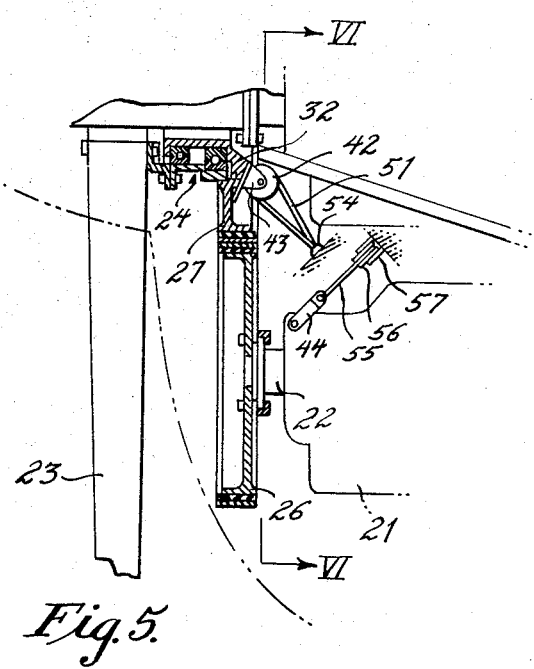
FIG. 5 is a side elevation similar to FIG. 3 but with an added component to constitute a further embodiment of the invention.

FIGS. 5 and 6 show from the side and front, respectively, an embodiment of the invention like that shown in the last two preceding views but with addition of stay 55 looped about pulley 56 carried by bracket 57 on a frame component (indicated schematically) at a location to the rear of point 54 of attachment of stay 51 (which itself is shown shifted slightly in the interest of clarity of the view). The ends of stay 55 are secured to the upper front portion of engine 21 by U-bracket 44, which is pivoted backward with respect to its previous orientation for securing stay 41 in FIGS. 1 and 2. It will be apparent that rotational reaction of the engine to its own torque will tend to increase the tension in stay 55, and the increased tension may be resolved into radial and tangential components, much as in the instance of stay 41 (also an added, rearwardly directed component, which makes no significant contribution) except that the radial component in stay 55 will be somewhat greater at the same tension increase because of the stay orientation. The result is to press wheels 26 and 27 more tightly together.

FIGS. 7 and 8 show from the side and front, respectively, yet another modification of the invention differing only as hereinafter stated. Stay 61 shown in these views may be considered a composite of those shown in the last preceding views, extending (as a single line, rather than a loop) from bracket 43' on fixed supporting sleeve 32 to and about pulley 62 carried by bracket 63 secured to a frame component (indicated schematically) at a point between the respective engines and on to connect to U-bracket 44 on engine 21 as before. In this modification the individual tension increases from propeller thrust and engine torque reaction are combined in single stay 61, which is substantially L-shaped and continuous pulley 62 at the angle of the L, with the result of pressing wheels 26 and 27 more tightly together.

FIGS. 9 and 10 show from the side and front, respectively, a further modification of the invention differing from previous modifications by having pulley 42' located counterclockwise (viewed toward the rear as in FIG. 10) upwards of thirty degrees from the line joining the axes of wheels 26 and 27, rather than on that line as before, and having the ends of the loop of stay 71 secured as by a bolt at point 74 located at the upper right portion of engine 21 and intermediate the front and rear thereof. The lateral inclination of this stay hinges it more in line with the clockwise torque reaction direction of engine 21 (rotation of shaft 22 thereof being assumed counterclockwise), and the resulting tension increase is added in this single stay to the tension increase resulting from forward thrust of propeller 23. The rearward inclination of this stay has a like effect to that of stay 51, for example. The overall effect is, of course, to press wheels 26 and 27 more tightly together despite the forces tending to separate them.

FIGS. 11 and 12 show from the side and front, respectively, a still further modification differing from that shown in FIGS. 9 and 10 only by reintroduction of stay 55 (cf. FIGS. 5 and 6). In this modification the component of force tending to displace engine 21 forwardly, which is imposed by rearwardly inclined stay 71, is counteracted by a rearwardly directed force imposed by forwardly inclined stay 55. The forces tending to press wheels 26 and 27 more tightly together are enhanced even further by this combination of stays.

Figure 13:
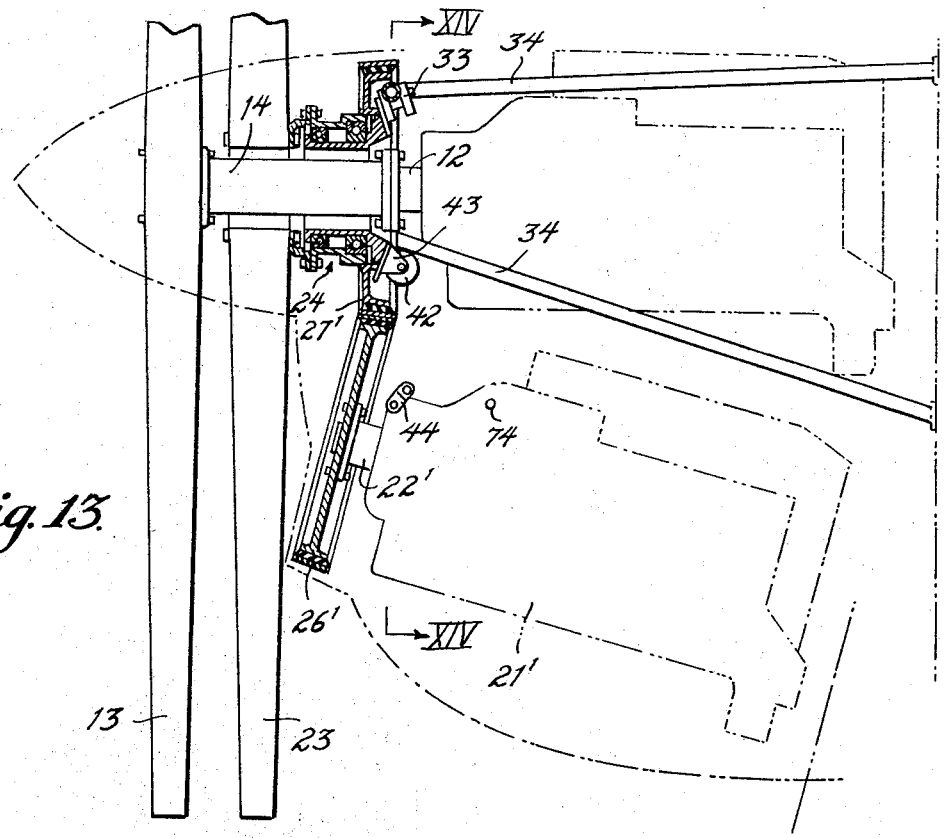
FIG. 13 is a side elevation, partly in section and partly diagrammatic, of a final aircraft embodiment of coaxial propeller drive system according to the present invention.
Figure 14:
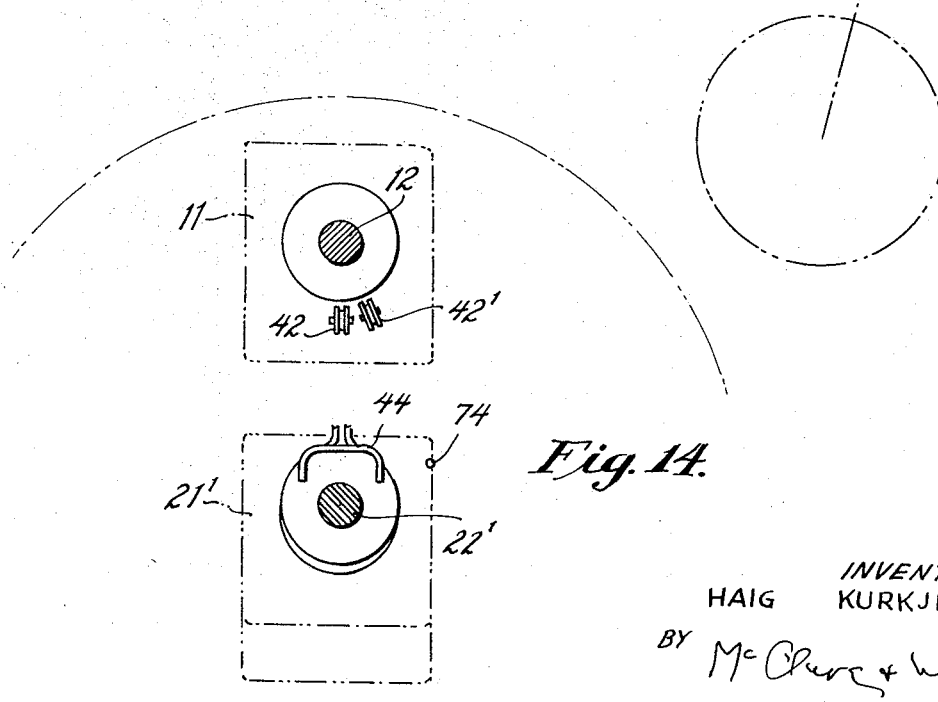
FIG. 14 is a diagrammatic front elevation of components of the embodiment shown in FIG. 13, taken at XIV—XIV thereon.

FIGS. 13 and 14 show from the side and front, respectively, provision for installation of stays, as already described for parallel engines and illustrated in the preceding views, in an otherwise identical coaxial propeller drive system except that engine 21' for driving the second engine is mounted to cant (in a vertical plane) its drive shaft 22' with respect to shaft 12 of engine 11 and that driving wheel 26' on shaft 22' and driven wheel 27' on shaft 12 have their edges mitered or beveled, preferably with each at an angle equal to half the angle at which the shafts are oriented to one another. This arrangement has the added advantage that any displacement tendency of the driving wheel to the rear or of the driven wheel toward the front increases their mutual contact pressure, and the stays may be arranged accordingly.

Advantages of the various embodiments and modifications described and illustrated herein have been mentioned, and others will be apparent from this teaching and from actual practicing of the invention. Other modifications, as by adding, combining, or subdividing parts or otherwise, may be made while retaining at least in part the benefits of this invention, which is defined in the following claims.

The claimed invention:

1. Propeller drive means for aircraft or the like having a plurality of propellers, comprising a plurality of engines for rotating the respective propellers, a frame supporting the engines, a first one of the engines having a first drive shaft for mounting a first propeller rotatably about an axis, a second one of the engines having a second drive shaft for interconnection to a second propeller rotatable about the same axis as the first propeller but spaced therefrom along the axis, a sleeve coaxial with the first drive shaft for mounting the second propeller, rotational drive means interconnected to the second drive shaft, contiguous rotational driven means interconnected to the sleeve, and stay means interconnected to the sleeve and subject to an increase of tension therein by virtue of the thrust of the second propeller, the stay means being effective to urge the rotational drive means and rotational driven means into tighter rotational contact with one another upon occurrence of such thrust.

2. The apparatus of claim 1 wherein the respective drive shafts are coplanar, and the rotational drive means and driven means have peripheral surfaces perpendicular to their own axes of rotation and in mutual contact to transmit and receive the torque of the second engine.

3. The apparatus of claim 1 wherein the respective drive shafts are oriented at an angle to one another in a common plane, and the rotational drive means and driven means have peripheral surfaces beveled with respect to their own axes of rotation, each at essentially half said angle, and in mutual contact to transmit and receive the torque of the second engine.

4. The apparatus of claim 1 wherein the stay means includes a tensioned member extending from the sleeve substantially perpendicular to the axis.

5. The apparatus of claim 1 wherein the stay means includes a tensioned member extending from the sleeve obliquely away from the second propeller.

6. The apparatus of claim 5 wherein the tensioned member is also substantially coplanar with the axis.

7. The apparatus of claim 5 wherein the tensioned member is also oblique with respect to a plane containing the axis and intersecting the second drive shaft.

8. Propeller drive means for aircraft or the like having a plurality of propellers, comprising a plurality of engines for rotating the respective propellers, a frame supporting the engines, a first one of the engines having a first drive shaft for mounting a first propeller rotatably about an axis, a second one of the engines having a second drive shaft for interconnection to a second propeller rotatable about the same axis as the first propeller but spaced therefrom along the axis, a sleeve coaxial with the first drive shaft for mounting the second propeller, rotational drive means interconnected to the second drive shaft, contiguous rotational driven means interconnected to the sleeve, and stay means interconnecting the sleeve to the housing of the second engine, the stay means including a tensioned member subject to an increase in tension therein by virtue of the thrust of the second propeller and also by virtue of the reaction of the second engine to its own torque and being effective thereby to urge the rotational drive means and driven means into tighter rotational contact with one another upon occurrence of such thrust and such torque reaction.

9. The apparatus of claim 8 wherein the tensioned member extends from the sleeve obliquely away from the second propeller to a location on the engine housing located in a plane common to the axis and the tensioned member.

10. The apparatus of claim 8 wherein the tensioned member extends from the sleeve obliquely away from the second propeller and obliquely away from a plane common to the second drive shaft and a point on the axis and aligned with the tensioned member.

11. Propeller drive means for aircraft or the like having a plurality of propellers, comprising a plurality of engines for rotating the respective propellers, a frame supporting the engines, a first one of the engines having a first drive shaft for mounting a first propeller rotatably about an axis, a second one of the engines having a second drive shaft for interconnection to a second propeller rotatable about the same axis as the first propeller but spaced therefrom along the axis, a sleeve coaxial with the first drive shaft for mounting the second propeller, rotational drive means interconnected to the second drive shaft, contiguous rotational driven means interconnected to the sleeve, and stay means interconnecting the sleeve to the frame, the stay means including a tensioned member subject to an increase in tension therein by virtue of the thrust of the second propeller, being effective thereby to urge the rotational drive means and driven means into tighter rotational contact with one another upon occurrence of such thrust.

12. Propeller drive means for aircraft or the like having a plurality of propellers, comprising a plurality of engines for rotating the respective propellers, a frame supporting the engines, a first one of the engines having a first drive shaft for mounting a first propeller rotatably about an axis, a second one of the engines having a second drive shaft for interconnection to a second propeller rotatable about the same axis as the first propeller but spaced therefrom along the axis, a sleeve coaxial with the first drive shaft for mounting the second propeller, rotational drive means interconnected to the second drive shaft, contiguous rotational driven means interconnected to the sleeve, and stay means interconnecting the second engine to the frame, the stay means including a tensioned member subject to an increase in tension therein by virtue of the reaction of the second engine to its own torque and being effective thereby to urge the rotational drive means and driven means into tighter rotational contact with one another upon occurrence of such torque reaction.

13. Propeller drive means for aircraft or the like having a plurality of propellers, comprising a plurality of engines for rotating the respective propellers, a frame supporting the engines, a first one of the engines having a first drive shaft for mounting a first propeller rotatably about an axis, a second one of the engines having a second drive shaft for interconnection to a second propeller rotatable about the same axis as the first propeller but spaced therefrom along the axis, a sleeve coaxial with the first drive shaft for mounting the second propeller, rotational drive means interconnected to the second drive shaft, contiguous rotational driven means interconnected to the sleeve, and stay means interconnecting the sleeve and the housing of the second engine to the frame, the stay means including a tensioned member subject to an increase in tension therein by virtue of the thrust of the second propeller and also by virtue of the reaction of the second engine to its own torque and being effective thereby to urge the rotational drive means and driven means into tighter rotational contact with one another upon occurrence of such thrust and such torque reaction.

14. The apparatus of claim 13 wherein the stay means includes a first tensioned member interconnecting the sleeve to the frame and a second tensioned member interconnecting the housing of the second engine to the frame.

15. The apparatus of claim 14 wherein the first and second tensioned members are oriented substantially perpendicular to one another.

16. The apparatus of claim 13 wherein the stay means includes a pulley anchored to the frame, a flexible tensioned member extending through approximately a quadrant of arc about the pulley, and means securing the tensioned member at its opposite ends to the sleeve and the housing of the second engine.

References Cited
UNITED STATES PATENTS

| | | | |
|---|---|---|---|
| 1,394,870 | 10/1921 | Thomas | 170—135.25 |
| 1,779,644 | 10/1930 | Silver | 170—135.25 |

MILTON BUCHLER, *Primary Examiner.*

B. BELKIN, *Assistant Examiner.*

UNITED STATES PATENT OFFICE
CERTIFICATE OF CORRECTION

Patent No. 3,335,979                        August 15, 1967

Haig Kurkjian

It is certified that error appears in the above identified patent and that said Letters Patent are hereby corrected as shown below:

Column 3, line 49, after "continuous" insert -- about --.

Signed and sealed this 17th day of February 1970.

(SEAL)
Attest:

Edward M. Fletcher, Jr.              WILLIAM E. SCHUYLER, JR.
Attesting Officer                      Commissioner of Patents